United States Patent
Bhattacharyya

(10) Patent No.: US 10,325,361 B2
(45) Date of Patent: Jun. 18, 2019

(54) SYSTEM, METHOD AND COMPUTER PROGRAM PRODUCT FOR AUTOMATICALLY GENERATING A WAFER IMAGE TO DESIGN COORDINATE MAPPING

(71) Applicant: KLA-Tencor Corporation, Milpitas, CA (US)

(72) Inventor: Santosh Bhattacharyya, San Jose, CA (US)

(73) Assignee: KLA-Tencor Corporation, Milpitas, CA (US)

(*) Notice: Subject to any disclaimer, the term of this patent is extended or adjusted under 35 U.S.C. 154(b) by 175 days.

(21) Appl. No.: 15/367,076

(22) Filed: Dec. 1, 2016

(65) Prior Publication Data
US 2017/0352146 A1 Dec. 7, 2017

Related U.S. Application Data

(60) Provisional application No. 62/343,853, filed on Jun. 1, 2016.

(51) Int. Cl.
*G06K 9/00* (2006.01)
*G06T 7/00* (2017.01)
*G06T 7/33* (2017.01)

(52) U.S. Cl.
CPC ............ *G06T 7/0006* (2013.01); *G06T 7/001* (2013.01); *G06T 7/33* (2017.01); *G06T 2207/10004* (2013.01); *G06T 2207/20101* (2013.01); *G06T 2207/30148* (2013.01)

(58) Field of Classification Search
CPC ......... G06T 7/0006; G06T 7/33; G06T 7/001; G06T 2207/20101; G06T 2207/30148; G06T 2207/10004
See application file for complete search history.

(56) References Cited

U.S. PATENT DOCUMENTS

| | | | | |
|---|---|---|---|---|
| 5,585,737 | A * | 12/1996 | Shibata | G01R 1/07342 324/754.11 |
| 6,724,929 | B1 * | 4/2004 | Matsuoka | G06T 7/001 382/145 |
| 6,886,153 | B1 * | 4/2005 | Bevis | G03F 7/70533 716/51 |
| 8,126,255 | B2 | 2/2012 | Bhaskar et al. | |
| 2004/0121496 | A1 * | 6/2004 | Brankner | G01N 21/95607 438/14 |

(Continued)

FOREIGN PATENT DOCUMENTS

WO  2005081910 A2  9/2005

OTHER PUBLICATIONS

International Search Report and Written Opinion from PCT Application No. PCT/US2017/035300, dated Sep. 12 2017.

*Primary Examiner* — Samir A Ahmed
(74) *Attorney, Agent, or Firm* — Zilka-Kotab, PC

(57) ABSTRACT

A system, method, and computer program product are provided for automatically generating a wafer image to design coordinate mapping. In use, a design of a wafer is received by a computer processor. In addition, an image of a wafer fabricated from the design is received by the computer processor. Further, a coordinate mapping between the design and the image is automatically generated by the computer processor.

11 Claims, 6 Drawing Sheets

(56) References Cited

U.S. PATENT DOCUMENTS

| | | | |
|---|---|---|---|
| 2007/0156379 A1* | 7/2007 | Kulkarni | G06F 17/5045 |
| | | | 703/14 |
| 2007/0230770 A1* | 10/2007 | Kulkarni | G06F 17/5045 |
| | | | 382/149 |
| 2007/0288219 A1* | 12/2007 | Zafar | G03F 1/84 |
| | | | 703/14 |
| 2008/0162065 A1 | 7/2008 | Takeda et al. | |
| 2009/0037134 A1* | 2/2009 | Kulkarni | G01N 21/9501 |
| | | | 702/127 |
| 2012/0086796 A1* | 4/2012 | Lewis | G01N 21/956 |
| | | | 348/87 |
| 2013/0064442 A1 | 3/2013 | Chang et al. | |
| 2014/0219543 A1 | 8/2014 | Kuo et al. | |
| 2015/0062571 A1 | 3/2015 | Kulkarni et al. | |
| 2016/0011123 A1* | 1/2016 | Shibata | G01N 21/956 |
| | | | 356/237.5 |

\* cited by examiner

SYSTEM, METHOD AND COMPUTER PROGRAM PRODUCT FOR AUTOMATICALLY GENERATING A WAFER IMAGE TO DESIGN COORDINATE MAPPING

RELATED APPLICATION(S)

This application claims the benefit of U.S. Provisional Patent Application No. 62/343,853 filed Jun. 1, 2016, the entire contents of which are incorporated herein by reference.

FIELD OF THE INVENTION

The present invention relates to wafer image processing, and more particularly to wafer design to image mapping.

BACKGROUND

In general, wafer image processing involves an inspection system collecting an image of a wafer that has been fabricated from a particular design and processing the image for various purposes, such as to detect defects within the design and/or the wafer. However, this image processing typically requires a coordinate mapping between the wafer design and the wafer image. Just by way of example, with the dimensions of wafer features decreasing, defects likewise are becoming smaller. Within a wafer image these defects may be fuzzy due to their small size and therefore difficult to accurately pinpoint. Wafer to image mappings can allow for the above mentioned defects to be more accurately located within the design and/or image.

Unfortunately, current techniques for generating wafer design to image mappings are prone to error. In particular, these techniques rely on users manually making correlations between the design and image. Prior Art FIG. 1 illustrates a conventional method for a user to manually make the design/image correlations. As shown, a first screen 102 displays the design and a second screen 104 displays the wafer image. The user selects (e.g. by clicking) a location in displayed design and a location in the displayed wafer image, as illustrated by the "+" to make a correlation between the two locations.

As noted above, this manual-based wafer design to image mapping is generally prone to errors. Specifically, error may be introduced due to positioning inaccuracy of the stage of the inspection system on which the wafer is placed. As another example, error may be introduced due to the user making an inaccurate selection of a location on the design and/or image. As yet another example, as the user is clicking on a wireframe design and not on a rendered design image, the raw design does not match with the wafer image accurately unless the wireframe design is rendered accurately.

There is thus a need for addressing these and/or other issues associated with the prior art techniques used for generating wafer design to image mappings.

SUMMARY

A system, method, and computer program product are provided for automatically generating a wafer image to design coordinate mapping. In use, a design of a wafer is received by a computer processor. In addition, an image of a wafer fabricated from the design is received by the computer processor. Further, a coordinate mapping between the design and the image is automatically generated by the computer processor.

DETAILED DESCRIPTION

The following description discloses a system, method, and computer program product for automatically generating a wafer image to design coordinate mapping. It should be noted that this system, method, and computer program product, including the various embodiments described below, may be implemented in the context of any inspection or review system (e.g. wafer inspection, reticle inspection, laser scanning inspection systems. Defect scanning electron microscope (SEM) review, etc.), such as the one described below with reference to FIG. 2B.

Figure 2A:
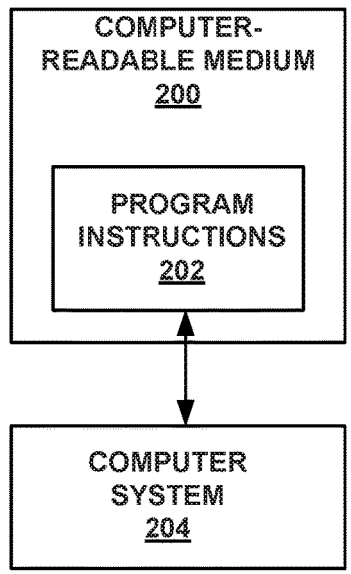
FIG. 2A shows a block diagram illustrating one embodiment of a non-transitory computer-readable medium that includes program instructions executable on a computer system for performing one or more of the computer-implemented methods described herein.

An additional embodiment relates to a non-transitory computer-readable medium storing program instructions executable on a computer system for automatically generating a wafer image to design coordinate mapping. One such embodiment is shown in FIG. 2A. In particular, as shown in FIG. 2A, computer-readable medium 200 includes program instructions 202 executable on computer system 204. The computer-implemented method includes the steps of the method described below with reference to FIG. 3. The computer-implemented method for which the program instructions are executable may include any other operations described herein (e.g. with respect to the methods of FIGS. 4 and/or 5).

Program instructions 202 implementing methods such as those described herein may be stored on computer-readable medium 200. The computer-readable medium may be a storage medium such as a magnetic or optical disk, or a magnetic tape or any other suitable non-transitory computer-readable medium known in the art. As an option, computer-readable medium 200 may be located within computer system 204.

The program instructions may be implemented in any of various ways, including procedure-based techniques, component-based techniques, and/or object-oriented techniques, among others. For example, the program instructions may be implemented using ActiveX controls, C++ objects, Java-Beans, Microsoft Foundation Classes ("MFC"), or other technologies or methodologies, as desired.

The computer system 204 may take various forms, including a personal computer system, image computer, mainframe computer system, workstation, network appliance. Internet appliance, or other device. In general, the term "computer system" may be broadly defined to encompass any device having one or more processors, which executes instructions from a memory medium. The computer system 204 may also include any suitable processor known in the art such as a parallel processor. In addition, the computer system 204 may include a computer platform with high speed processing and software, either as a standalone or a networked tool.

Figure 2B:
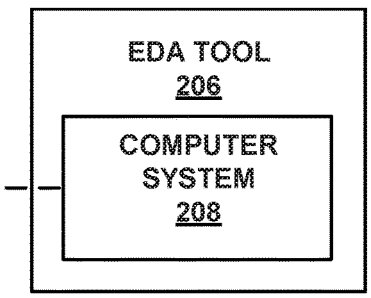
FIG. 2B is a schematic diagram illustrating a side view of one embodiment of an inspection system configured to detect defects on a fabricated device.
Figure 2B:
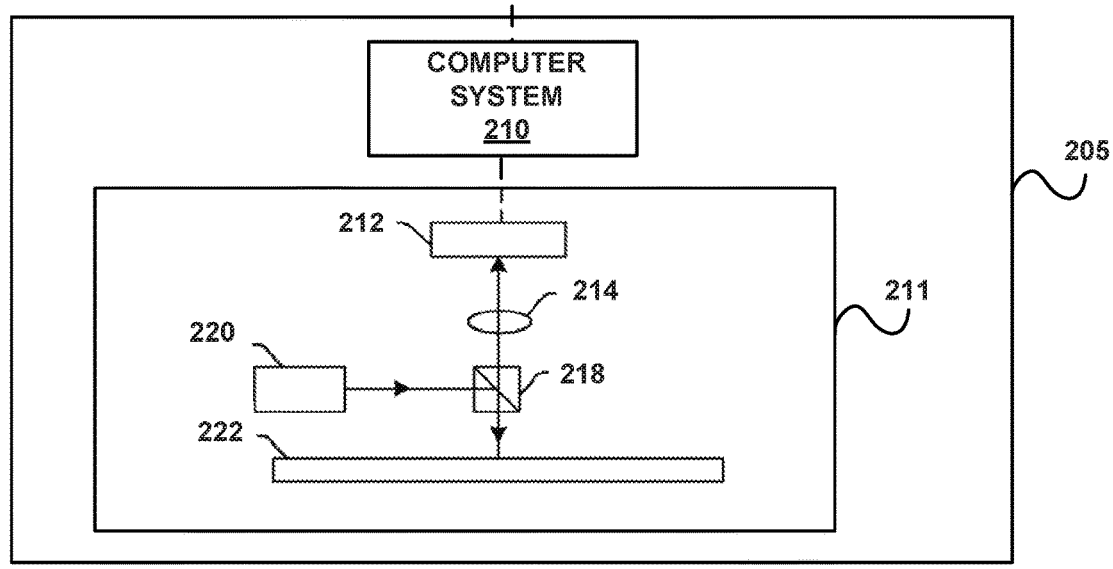

An additional embodiment relates to a system configured to automatically generate a wafer image to design coordinate mapping. One embodiment of such a system is shown in FIG. 2B. The system includes inspection system 305 configured to generate output for a component fabricated on a wafer. The system also includes one or more computer systems configured for performing the operations described below with reference to FIG. 3, etc. The one or more computer systems may be configured to perform these operations according to any of the embodiments described herein. The computer system(s) and the system may be configured to perform any other operations described herein and may be further configured as described herein.

In the embodiment shown in FIG. 2B, one of the computer systems is part of an electronic automation design (EAD) tool, and the inspection system and another of the computer systems are not part of the EAD tool. These computer system may include, for example, the computer system 204 described above with reference to FIG. 2A. For example, as shown in FIG. 2B, one of the computer systems may be computer system 208 included in EAD tool 206. The EAD tool 206 and the computer system 208 included in such a tool may include any commercially available EAD tool.

The inspection system 205 may be configured to generate the output for the component fabricated on a wafer by scanning the wafer with light and detecting light from the wafer during the scanning. For example, as shown in FIG. 2B, the inspection system 205 includes light source 220, which may include any suitable light source known in the art. Light from the light source may be directed to beam splitter 218, which may be configured to direct the light from the light source to wafer 222. The light source 220 may be coupled to any other suitable elements (not shown) such as one or more condensing lenses, collimating lenses, relay lenses, objective lenses, apertures, spectral filters, polarizing components and the like. As shown in FIG. 2B, the light may be directed to the wafer 222 at a normal angle of incidence. However, the light may be directed to the wafer 222 at any suitable angle of incidence including near normal and oblique incidence. In addition, the light or multiple light beams may be directed to the wafer 222 at more than one angle of incidence sequentially or simultaneously. The inspection system 205 may be configured to scan the light over the wafer 222 in any suitable manner.

Light from wafer 222 may be collected and detected by one or more channels of the inspection system 205 during scanning. For example, light reflected from wafer 222 at angles relatively close to normal (i.e., specularly reflected light when the incidence is normal) may pass through beam splitter 218 to lens 214. Lens 214 may include a refractive optical element as shown in FIG. 2B. In addition, lens 214 may include one or more refractive optical elements and/or one or more reflective optical elements. Light collected by lens 214 may be focused to detector 212. Detector 212 may include any suitable detector known in the art such as a charge coupled device (CCD) or another type of imaging detector. Detector 212 is configured to generate output that is responsive to the reflected light collected by lens 214. Therefore, lens 214 and detector 212 form one channel of the inspection system 205. This channel of the inspection system 205 may include any other suitable optical components (not shown) known in the art.

Since the inspection system shown in FIG. 2B is configured to detect light specularly reflected from the wafer 222, the inspection system 205 is configured as a BF inspection system. Such an inspection system 205 may, however, also be configured for other types of wafer inspection. For example, the inspection system shown in FIG. 2B may also include one or more other channels (not shown). The other channel(s) may include any of the optical components described herein such as a lens and a detector, configured as a scattered light channel. The lens and the detector may be further configured as described herein. In this manner, the inspection system 205 may also be configured for DF inspection.

The inspection system 205 may also include a computer system 210 that is configured to perform one or more steps of the methods described herein. For example, the optical elements described above may form optical subsystem 211 of inspection subsystem 205, which may also include computer system 210 that is coupled to the optical subsystem 211. In this manner, output generated by the detector(s) during scanning may be provided to computer system 210. For example, the computer system 210 may be coupled to detector 212 (e.g., by one or more transmission media shown by the dashed line in FIG. 2B, which may include any suitable transmission media known in the art) such that the computer system 210 may receive the output generated by the detector.

The computer system 210 of the inspection system 205 may be configured to perform any operations described herein. For example, computer system 210 may be configured for automatically generating a wafer image to design mapping as described herein. In addition, computer system 210 may be configured to perform any other steps described herein. Furthermore, although some of the operations described herein may be performed by different computer systems, all of the operations of the method may be performed by a single computer system such as that of the inspection system 205 or a standalone computer system. In addition, the one or more of the computer system(s) may be configured as a virtual inspector such as that described in U.S. Pat. No. 8,126,255 issued on Feb. 28, 2012 to Bhaskar et al., which is incorporated by reference as if fully set forth herein.

The computer system 210 of the inspection system 205 may also be coupled to another computer system that is not part of the inspection system such as computer system 208, which may be included in another tool such as the EAD tool 206 described above such that computer system 210 can receive output generated by computer system 208, which may include a design generated by that computer system 208. For example, the two computer systems may be effectively coupled by a shared computer-readable storage medium such as a fab database or may be coupled by a transmission medium (e.g. network, etc.) such as that described above such that information may be transmitted between the two computer systems.

It is noted that FIG. 2B is provided herein to generally illustrate a configuration of an inspection system that may be included in the system embodiments described herein. Obviously, the inspection system configuration described herein may be altered to optimize the performance of the inspection system as is normally performed when designing a commercial inspection system. In addition, the systems described herein may be implemented using an existing inspection system (e.g., by adding functionality described herein to an existing inspection system) such as the 39xx/29xx/28xx series of tools that are commercially available from KLA-Tencor. For some such systems, the methods described herein may be provided as optional functionality of the system (e.g., in addition to other functionality of the system). Alternatively, the system described herein may be designed "from scratch" to provide a completely new system.

Figure 3:
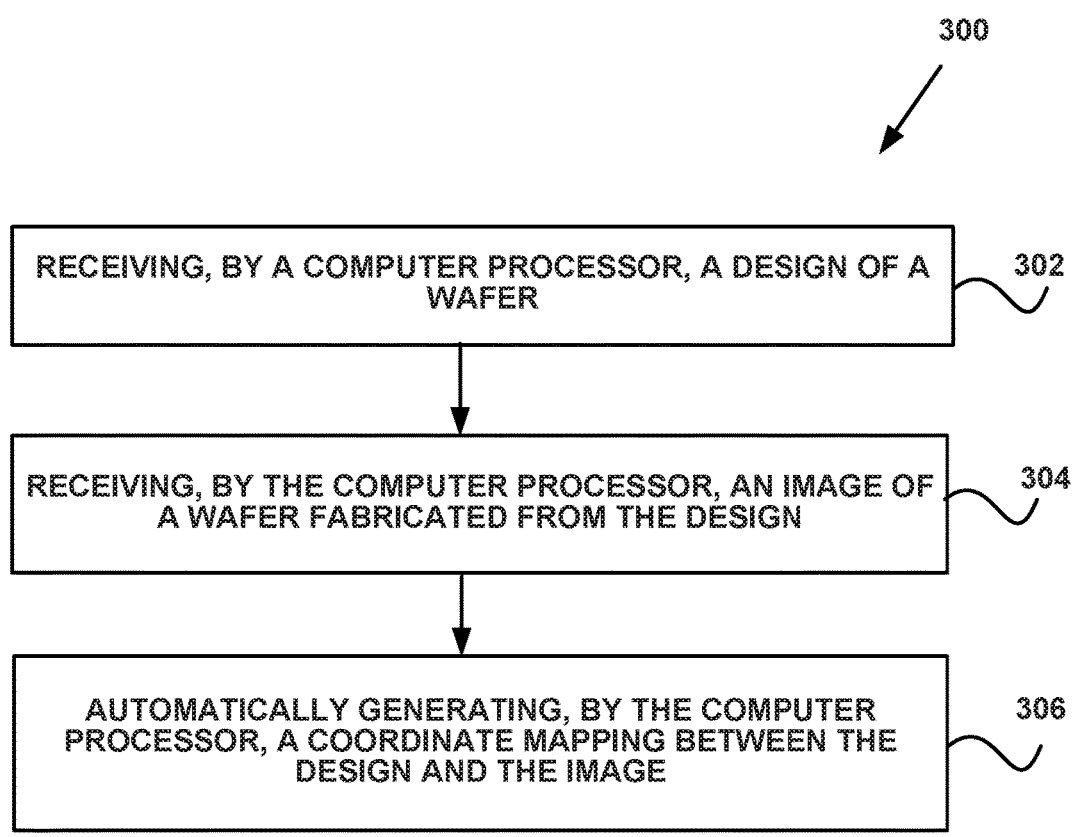
FIG. 3 illustrates a method for automatically generating a wafer image to design coordinate mapping, in accordance with an embodiment.

FIG. 3 illustrates a method 300 for automatically generating a wafer image to design coordinate mapping, in accordance with an embodiment. The method 300 may be carried out in the context of the environments described above with reference to FIGS. 2A and/or 2B. For example, the method 300 may be carried out by a computer processor of any of the computer systems described above in FIGS. 2A and/or 2B. Further, the aforementioned definitions may equally apply to the present description.

As shown in operation 302, a design of a wafer is received. In an embodiment, the design of the wafer may be stored in computer memory. With respect to this embodiment, the design may be received by being retrieved from the computer memory.

In the context of the present description, the wafer refers to a device fabricated of semiconductor material and having a plurality of dies situated thereon, as is well known in the art of semiconductor technology. The design of the wafer may accordingly define specifications (e.g. measurements, etc.) for the various features (e.g. dies) of the wafer. In any case, the design is capable of being used to fabricate the wafer.

In addition, as shown in operation 304, an image of a wafer fabricated from the design is received. In an embodiment, the image of the wafer may be received from an inspection system. This inspection system may be that described above with reference to FIGS. 2A and 2B, and may inspect the wafer fabricated from the design to generate the image of the fabricated wafer. The image may show the various features (e.g. dies) of the wafer.

Further, as shown in operation 306, a coordinate mapping between the design and the image is automatically generated. The coordinate mapping may map coordinates of the design with coordinates of the image, wherein the design feature and the image feature at those mapped coordinates are matching. In this way, an alignment of the design and the image may be provided by the mapping.

In the context of the present description, automatically generating the coordinate mapping includes processing the design and the image, by a computer processor, to automatically generate the coordinate mapping between the design and the image. For example, pattern matching may be utilized to automatically generate the coordinate mapping. As other examples, a predefined algorithm, script, computer program, etc. may be executed by the computer processor to automatically generate the coordinate mapping between the design and the image.

In one embodiment, the design and the image may be displayed within a user interface. A first user selection of a location on the design (e.g. two points on the design) and a second user selection of a location on the image (e.g. two points on the image) may be received through the user interface. Further in this embodiment, the coordinate mapping between the design and the image may be automatically generated by processing the design and the image based on the first user selection and the second user selection (e.g. by performing pattern matching between the user selected location on the image and the user selected location on the design). Another embodiment of automatically generating the coordinate mapping between the design and the image is disclosed below with reference to FIG. 5.

Figure 1:
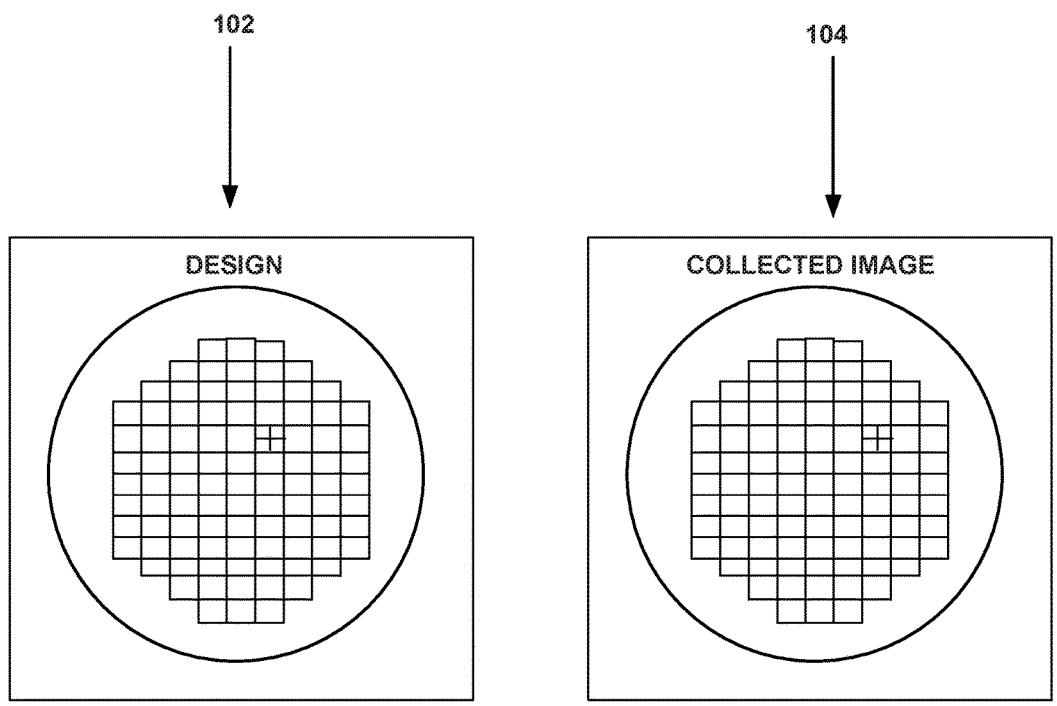
FIG. 1 shows a conventional method for a user to manually make correlations between a wafer design and a wafer image, in accordance with the prior art.

Automating the generation of the coordinate mapping between the design and the image can enable the coordinate mapping to be more accurate than the manually entered coordinate mappings of the prior art (e.g. see FIG. 1 and related description above). In particular, user error may be eliminated since the coordinate mapping may be automatically generated through a systematic computer process, as disclosed above, instead of from the user directly providing design/image coordinate correlations. As another example, as error resulting from inaccurate positioning of the stage of the inspection system on which the fabricated wafer is placed may also be eliminated, since the automatically generated coordinate mapping may accurately align the design with the image.

The more accurate design to image coordinate mapping described above may further improve other processes employed by inspection, review, etc. tools which utilize the coordinate mapping for various purposes. For example, a pixel to design alignment (PDA) method that uses this coordinate mapping for placing care areas accurately will be more stable and accurate, due to the better coordinate mapping. As another example, better defect location accuracy (DLA) for defects on the design and/or image may be provided through use of the automatically generated coordinate mapping.

Figure 4:
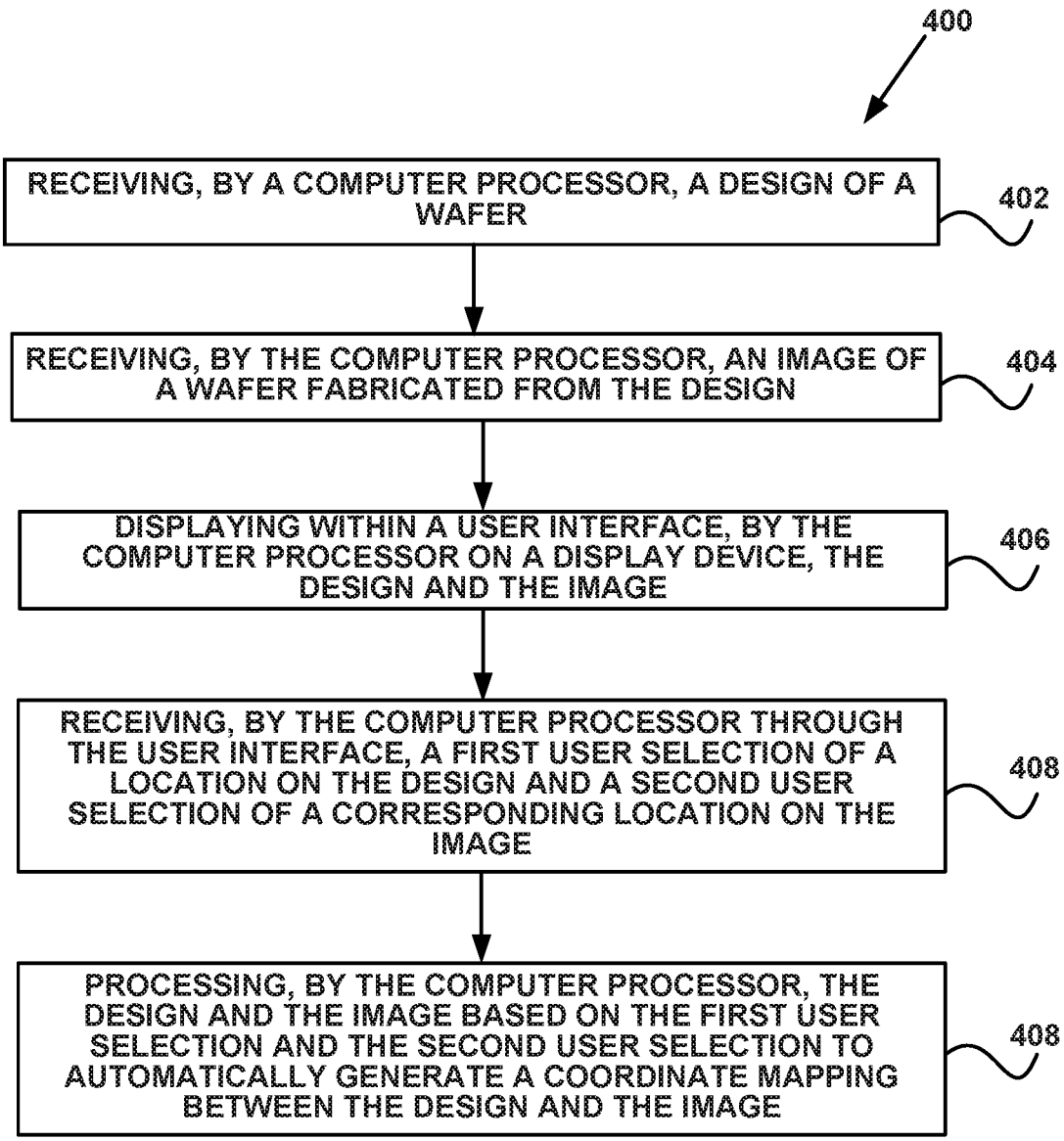
FIG. 4 illustrates a method for processing user input to automatically generate a wafer image to design coordinate mapping, in accordance with another embodiment.

FIG. 4 illustrates a method 400 for processing user input to automatically generate a wafer image to design coordinate mapping, in accordance with another embodiment. The method 400 may be carried out in the context of the environments described above with reference to FIGS. 2A and/or 2B. For example, the method 400 may be carried out by a computer processor of any of the computer systems described above in FIGS. 2A and/or 2B. Further, the aforementioned definitions may equally apply to the present description.

As shown in operation 402, a design of a wafer is received (e.g. from memory). As shown in operation 404, an image of a wafer fabricated from the design is received (e.g. from an inspection system inspecting the wafer). The design and the image are then displayed within a user interface on a display device (e.g. computer screen), as shown in operation 406. In an embodiment, the design of the wafer may be displayed as a wireframe image.

In operation 408, a first user selection of a location on the design and a second user selection of a location on the image are received through the user interface. The first user selection of the location on the design may be two points on the design (i.e. clicked or otherwise selected by the user). The second user selection of the location on the image may two points on the image (i.e. clicked or otherwise selected by the user). This may be accomplished similarly to the prior art technique described above with reference to FIG. 1.

Figure 5:
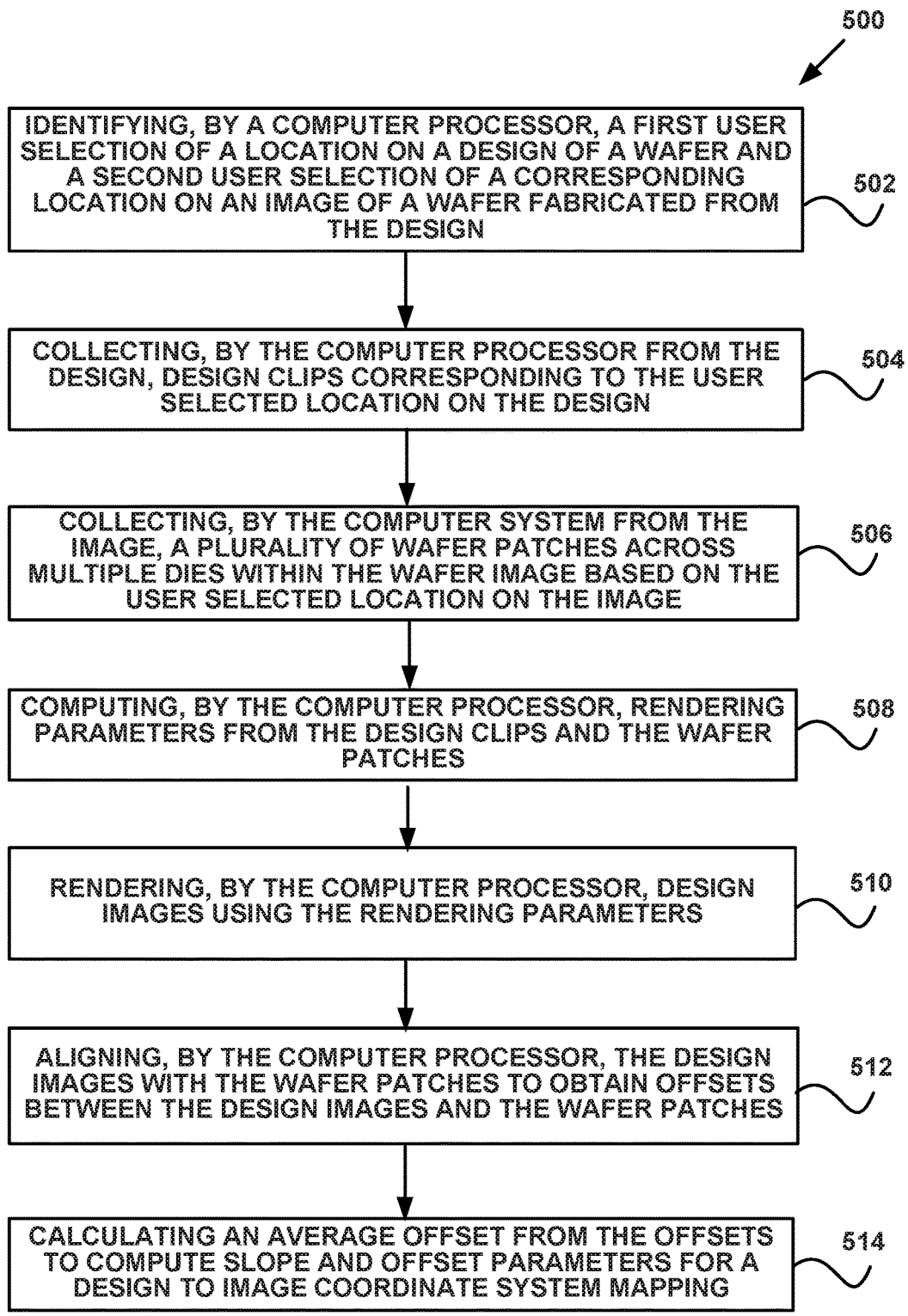
FIG. 5 illustrates a method for using wafer patches across multiple dies within a wafer image to automatically generate a wafer image to design coordinate mapping, in accordance with yet another embodiment.

Further, in operation 410, the design and the image are processed by a computer processor, based on the first user selection and the second user selection received in operation 408. In the present embodiment, this computer processing of the design and the image automatically generates a coordinate mapping between the design and the image. FIG. 5 illustrates one example of the sub-operations that may be included in operation 410 to automatically generate the coordinate mapping between the design and the image.

FIG. 5 illustrates a method 500 for using wafer patches across multiple dies within a wafer image to automatically generate a wafer image to design coordinate mapping, in accordance with yet another embodiment. The method 500 may be carried out in the context of the environments described above with reference to FIGS. 2A and/or 2B. For example, the method 500 may be carried out as an algorithm, script, or computer program executed by a computer processor of any of the computer systems described above in FIGS. 2A and/or 2B. Further, the method 500 may be executed as operation 410 of FIG. 4. Again, the aforementioned definitions may equally apply to the present description.

As shown in operation 502, a first user selection of a location on a wafer design and a second user selection of a corresponding location on an image of a wafer fabricated from the design are received. This user input may be that described above with reference to operations 402 and 404 of FIG. 4.

In operation 504, design clips corresponding to the user selected location on the design are collected. The design clips may be portions of the design selected by the user (i.e. as the first user selection mentioned above). In operation 506, a plurality of wafer patches across multiple dies within the wafer image are collected based on the user selected location on the image. In other words, the user selected location on the image may be within a single die within the image, and may be extended to multiple other dies within the image.

Figure 6:
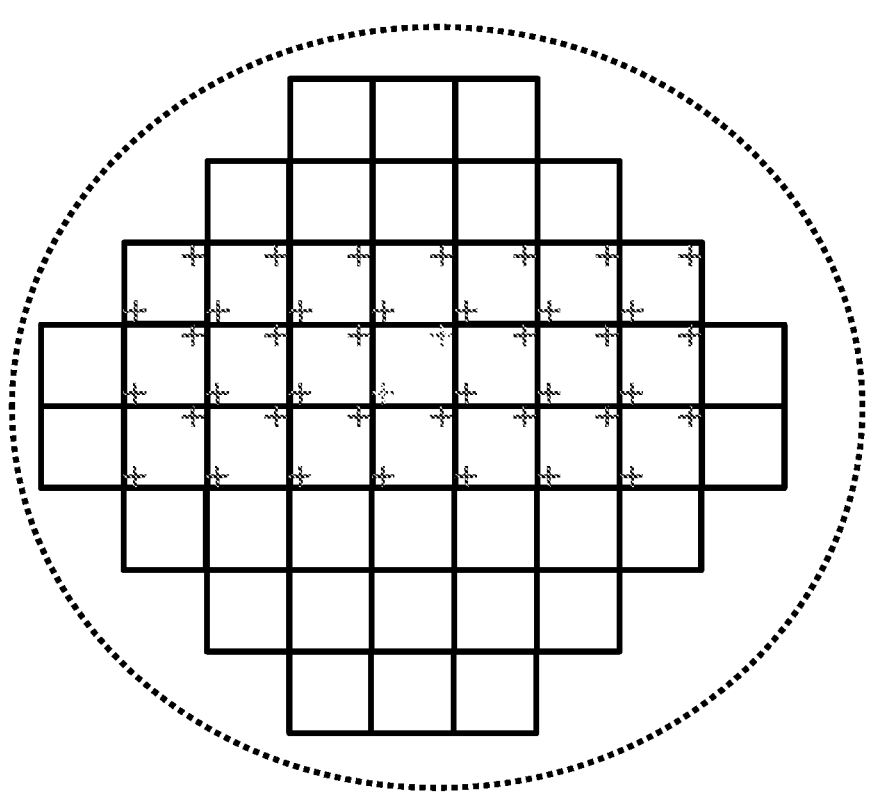
FIG. 6 illustrates wafer patches across multiple dies within a wafer image that are collected for use in automatically generating a wafer image to design coordinate mapping, in accordance with still yet another embodiment.

In one exemplary embodiment, the user selected location on the wafer may be within a first die on the wafer, and the plurality of wafer patches across the multiple dies within the wafer image may include: a first set of wafer patches from the location on the first die selected by the user, a second set of wafer patches from other dies within a same die row as the first die, and a third set of wafer patches from other dies within die rows adjacent to the die row having the first die. An example of this is shown in FIG. 6, where the user selected location is denoted by the dashed "+" indicators, and where this user selected location is automatically extended to include the solid "+" indicators, with each square in FIG. 6 representing a different die within the wafer image.

As an option, the second set of wafer patches and the third set of wafer patches may be identified using pattern matching with the first set of wafer patches. For example, a pattern may be identified for the user selected location which is within a first die in the image, and then a same pattern may be located in other dies within the image, namely in each die within a same die row as the first die and in each die within die rows adjacent to the die row having the first die.

Additionally, in operation 508, rendering parameters are computed from the design clips and the plurality of wafer patches that have been collected in operations 504 and 506. In particular, the design clips and the plurality of wafer patches may be input to a predefined algorithm which learns the rendering parameters from the design clips and the plurality of wafer patches.

Further, in operation 510, design images are rendered using the rendering parameters. In particular, the design clips mentioned above may be rendered using the rendering parameters. Then, in operation 512, the design images are aligned with the plurality of wafer patches to obtain offsets (e.g. x,y coordinate offsets) between the design images and the wafer patches. In other words, the design images are aligned with each of the wafer patches of the various dies to obtain, for each of the dies, an offset between the design images and the wafer patches of that die. Accordingly, a plurality of offsets are obtained.

In operation 514, an average offset is calculated from the plurality of offsets to compute slope and offset parameters for a design to image coordinate mapping. In particular, the computed slope and offset parameters may define the design to image coordinate mapping. In an embodiment, the average offset may be the average x coordinate offset and the average y coordinate offset. In another embodiment, the slope parameter for the design to image coordinate mapping may be determined from the average offset.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method, comprising:
receiving, by a computer processor, a design of a portion of a wafer;
receiving, by the computer processor, an image of a portion of a wafer fabricated from the design;
displaying within a user interface, by the computer processor on a display device, the design and the image;
receiving, by the computer processor through the user interface, a first user selection of a location on the design and a second user selection of a location on the image, wherein the first user selection of the location on the design includes two points on the design and the second user selection of the location on the image includes two points on the image; and
automatically generating, by the computer processor, a coordinate mapping between the design and the image by:
processing the design and the image based on the first user selection and the second user selection including collecting, from the design, design clips corresponding to the user selected location on the design and collecting, from the image, a plurality of wafer patches across multiple dies within the image based on the user selected location on the image.

2. The method of claim 1, wherein the design of the portion of the wafer is received by being retrieved from computer memory storing the design.

3. The method of claim 1, wherein the image of the portion of the wafer is received from an inspection system.

4. The method of claim 1, wherein the user selected location on the wafer is within a first die on the wafer, and wherein the plurality of wafer patches across the multiple dies within the image include:
a first set of wafer patches from the location on the first die selected by the user,
a second set of wafer patches from other dies within a same die row as the first die, and
a third set of wafer patches from other dies within die rows adjacent to the die row having the first die.

5. The method of claim 4, wherein the second set of wafer patches and the third set of wafer patches are identified using pattern matching with the first set of wafer patches.

6. The method of claim 1, wherein automatically generating, by the computer processor, the coordinate mapping between the design and the image further includes:
   computing rendering parameters from the design clips and the plurality of wafer patches,
   rendering design images using the rendering parameters,
   aligning the design images with the plurality of wafer patches to obtain offsets between the design images and the wafer patches, and
   calculating an average offset from the offsets to computer slope and offset parameters for the coordinate mapping between the design and the image.

7. A non-transitory computer readable medium storing computer code executable by a computer processor to perform a method comprising:
   receiving, by the computer processor, a design of a portion of a wafer;
   receiving, by the computer processor, an image of a portion of a wafer fabricated from the design;
   displaying within a user interface, by the computer processor on a display device, the design and the image;
   receiving, by the computer processor through the user interface, a first user selection of a location on the design and a second user selection of a location on the image, wherein the first user selection of the location on the design includes two points on the design and the second user selection of the location on the image includes two points on the image; and
   automatically generating, by the computer processor, a coordinate mapping between the design and the image by:
   processing the design and the image based on the first user selection and the second user selection including collecting, from the design, design clips corresponding to the user selected location on the design and collecting, from the image, a plurality of wafer patches across multiple dies within the image based on the user selected location on the image.

8. A system, comprising:
   a computer sub-system having a memory, and a processor for:
   receiving a design of a portion of a wafer;
   receiving an image of a portion of a wafer fabricated from the design;
   displaying within a user interface, on a display device, the design and the image;
   receiving, through the user interface, a first user selection of a location on the design and a second user selection of a location on the image, wherein the first user selection of the location on the design includes two points on the design and the second user selection of the location on the image includes two points on the image; and
   automatically generating a coordinate mapping between the design and the image by:
   processing the design and the image based on the first user selection and the second user selection including collecting, from the design, design clips corresponding to the user selected location on the design and collecting, from the image, a plurality of wafer patches across multiple dies within the image based on the user selected location on the image.

9. The system of claim 8, wherein the memory stores the design of the portion of the wafer.

10. The system of claim 8, wherein the image of the portion of the wafer is received from an inspection system.

11. The system of claim 8, wherein automatically generating the coordinate mapping between the design and the image further includes:
    computing rendering parameters from the design clips and the plurality of wafer patches,
    rendering design images using the rendering parameters,
    aligning the design images with the plurality of wafer patches to obtain offsets between the design images and the wafer patches, and
    calculating an average offset from the offsets to computer slope and offset parameters for the coordinate mapping between the design and the image.

* * * * *